Figure 1:
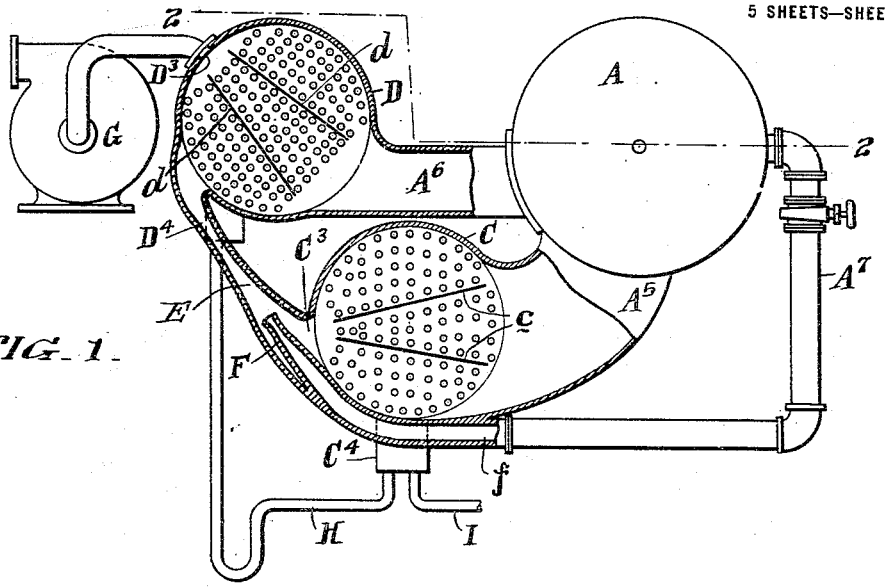

P. A. BANCEL.
MULTISTAGE STEAM CONDENSING.
APPLICATION FILED SEPT. 12, 1913.

1,143,349.

Patented June 15, 1915.

5 SHEETS—SHEET 1.

WITNESSES
Daniel Webster, Jr.
Stewart

INVENTOR
Paul A. Bancel
BY Francis C. Chambers
his ATTORNEY

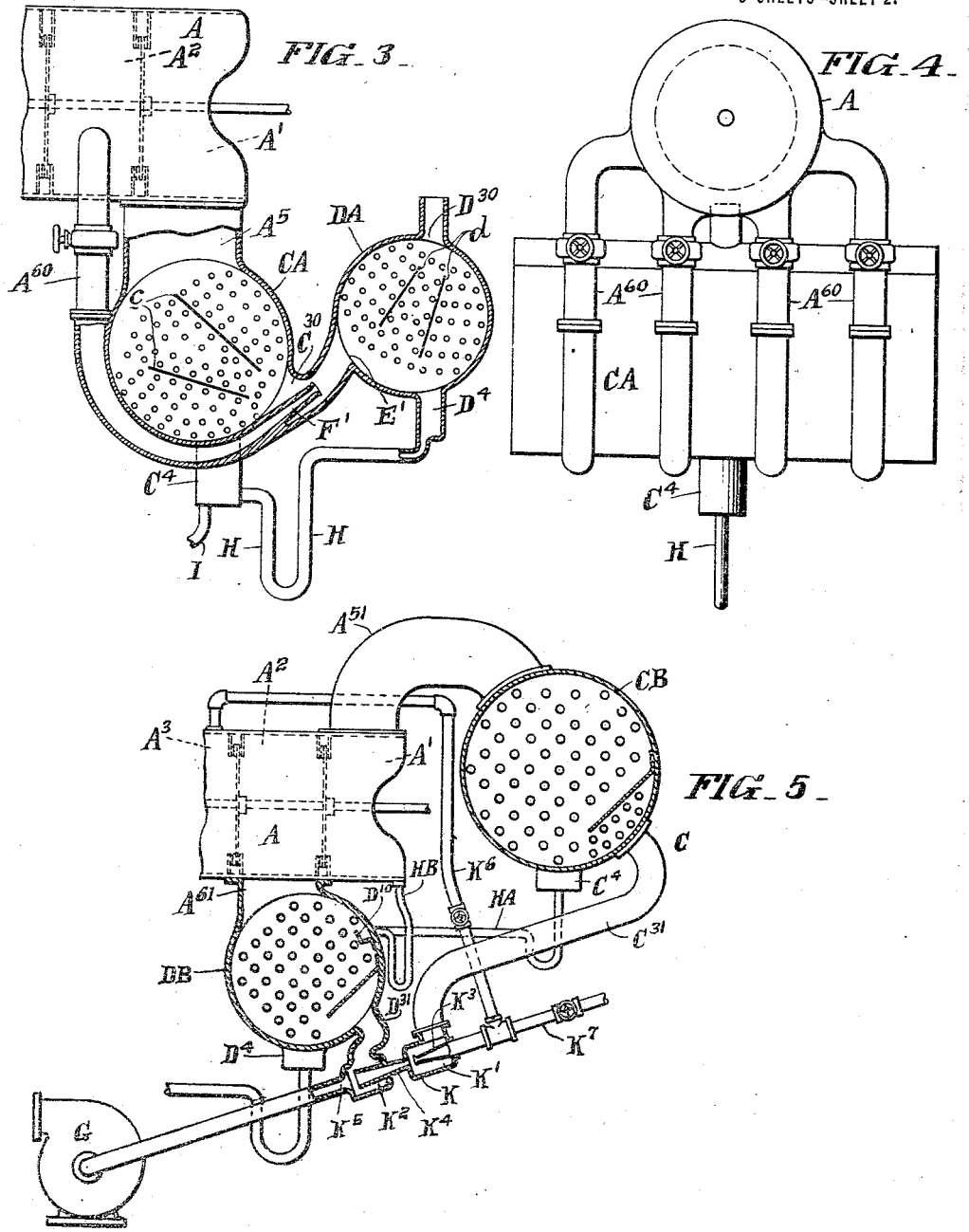

P. A. BANCEL.
MULTISTAGE STEAM CONDENSING.
APPLICATION FILED SEPT. 12, 1913.

1,143,349.

Patented June 15, 1915.
5 SHEETS—SHEET 3.

WITNESSES

INVENTOR
Paul A. Bancel
BY
ATTORNEY

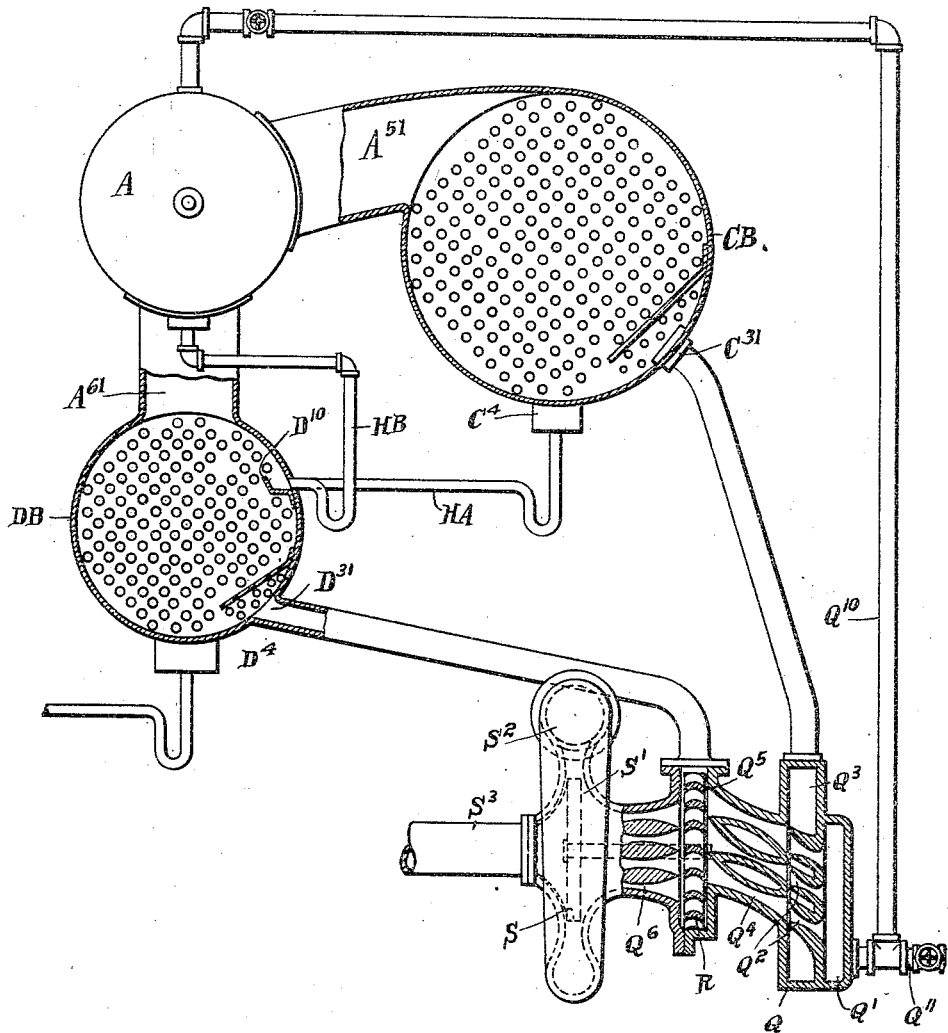

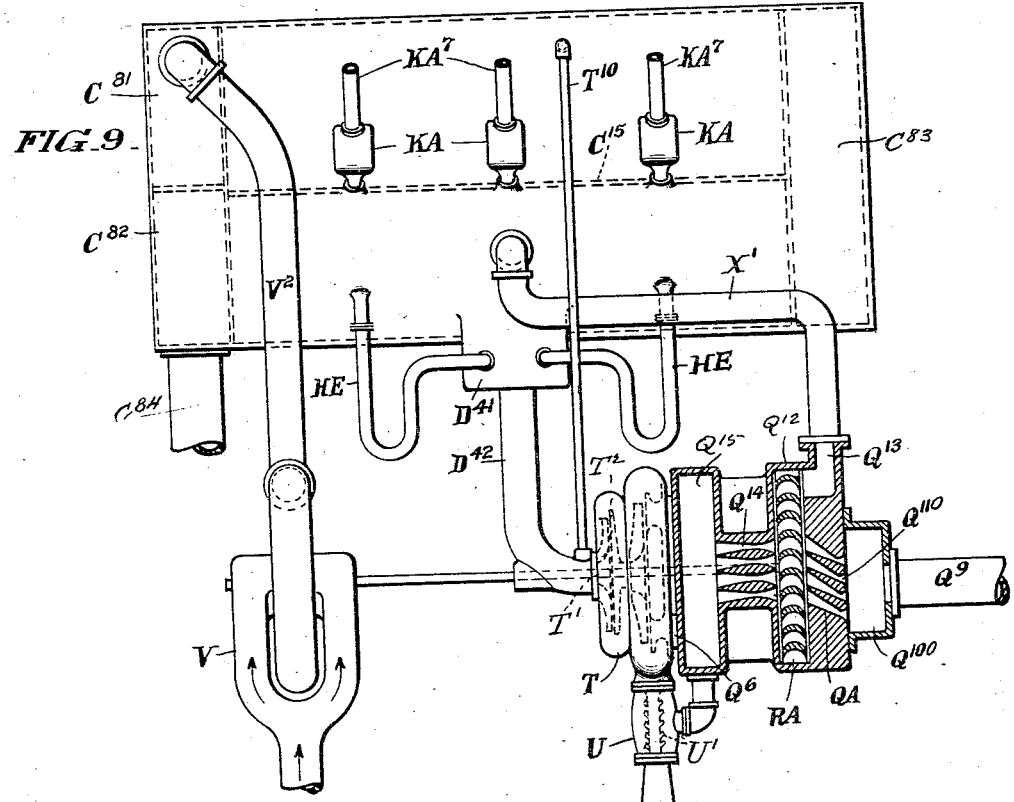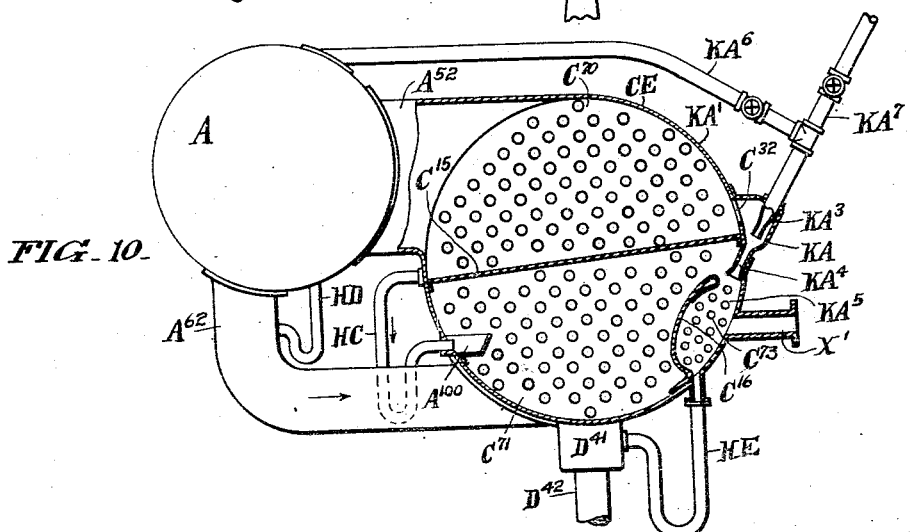

UNITED STATES PATENT OFFICE.

PAUL A. BANCEL, OF NEW YORK, N. Y.

MULTISTAGE STEAM-CONDENSING.

1,143,349.  Specification of Letters Patent.  Patented June 15, 1915.

Application filed September 12, 1913. Serial No. 789,422.

*To all whom it may concern:*

Be it known that I, PAUL A. BANCEL, a citizen of the United States of America, residing in the city, county, and State of New York, have invented certain new and useful Improvements in Multistage Steam-Condensing, of which the following is a true and exact description, reference being had to the accompanying drawings, which form a part thereof.

One main object of the present invention is to provide an improved method of, and apparatus for utilizing the energy of steam in performing mechanical work characterized by the relatively small bulk and consequently low cost of construction of the apparatus required for utilizing the energy of a given amount of steam in a satisfactorily efficient manner.

Another main object of my invention is to provide an improved method of, and apparatus for condensing steam supplied to the condensing apparatus at two or more pressures each of which are ordinarily far below atmospheric pressures. While the method of, and apparatus for condensing steam, which it is this object of my invention to provide, are of especial utility in attaining the first mentioned object of the invention, they are also of general utility regardless of the manner in which the steam to be condensed has previously been utilized or acquires its different pressures.

More specific objects of my invention are to increase the capacity and efficiency of condensing apparatus, to reduce the required capacity and increase the effectiveness of the air pumping or other vacuum creating and auxiliary condensing apparatus employed in conjunction with the main condensing apparatus; to make the location of a portion of the main condensing apparatus independent, in a measure, of the location of the turbine or other device exhausting into it; and to recover the water of condensation from the condensing apparatus at a temperature above that at which a portion of the water of condensation is formed.

At the present time it is common practice to utilize the energy available in low pressure steam, such as the exhaust steam from a high pressure turbine or reciprocating engine exhausting at a pressure at or somewhat below the pressure of the atmosphere, by passing the steam thus exhausted through a low pressure turbine or additional low pressure turbine wheels, exhausting the total volume of steam into a main condensing apparatus in which a high vacuum is maintained by the use of a suitable vacuum producing and auxiliary condensing apparatus for removing the air from the main condensing apparatus, and condensing the steam mixed with the air thus withdrawn from the main condensing apparatus. By the term air, as used in this connection, I mean to include not only atmospheric air, but other gases and vapors entering the condensing apparatus and not condensable therein under normal conditions of operation.

My present invention is especially devised and adapted for use in, or in connection with, this general mode of utilizing the available energy in low pressure steam, though some features of the invention are not restricted to such use.

In the practical utilization of the energy contained in low pressure steam in accordance with the present invention, I divide the condensing space of the main condensing apparatus into two separate and distinct portions, in one of which a higher vacuum is maintained than in the other, and I expand all or a major portion of the steam in the turbine and utilize the kinetic energy thus made available in imparting energy to the turbine wheels. In this expansion of the steam, however, one portion of the steam is expanded to a lower pressure in the turbine than is another portion. These two portions of the steam are passed into the higher and lower vacuum portions, respectively, of the main condenser. To withdraw the air from and thereby maintain the desired vacuum in the different portions of the main condensing apparatus I employ a vacuum producing and auxiliary condensing apparatus into which the air from these condensing spaces admixed with more or less steam from one or both of these spaces is discharged, and I compress the uncondensed residue from the main condensing section in which the higher vacuum is maintained to a pressure at least as high as that maintained in the lower vacuum main condensing space before delivering it to the vacuum producing and auxiliary condensing apparatus. I may pass the uncondensed residue from the higher vacuum main condensing space into the lower vacuum main condensing space so that the uncondensed residue from both condensing spaces passes to the auxiliary apparatus through the corresponding outlet of the low vacuum condensing space, or I may provide independent connections between each of the two main condensing spaces and the auxiliary apparatus. In the latter case I may compress the uncondensed residue from both sections, or from the high vacuum section only of the main condensing apparatus before delivering this residue to vacuum creating and auxiliary condensing apparatus proper. In some cases I utilize the jet action of the portion of the steam passing from the turbine to the low vacuum main condensing section to recompress the uncondensed residue from the high vacuum main condensing section and pass it into the said low vacuum section. In other cases I utilize the jet action of steam withdrawn from the turbine at a pressure above that maintained in either main condensing section or the jet action of steam from a separate source to recompress the uncondensed residue from one or both sections of the main condensing apparatus and pass it to the vacuum creating and auxiliary condensing apparatus proper.

The following explanation may facilitate an understanding of the character of the advantageous results obtained by the use of my invention. The efficiency and output of a steam turbine, operating at constant speed, and receiving steam at a given initial pressure, depends primarily upon three factors, namely—the amount of steam passed through the turbine, the extent to which the steam is expanded in passing through the turbine, and the residual velocity or kinetic energy of the steam leaving the turbine. With a given discharge pressure, the residual velocity of the steam will increase as the amount of steam passed through the turbine rises above the normal full load amount, and thus the efficiency of the turbine will decrease as the overload increases. With a given amount of steam passing through the turbine, a decrease in the pressure to which the steam is expanded in the turbine, will correspondingly increase the kinetic energy of the steam, but the resulting increase in volume of the steam necessitates a higher residual velocity in the steam to enable it to get through the low pressure wheel or wheels of the turbine when the turbine is operating at the normal full load or is overloaded. While lowering the exhaust pressure tends to directly increase the efficiency of the turbine, it does this at the expense of the capacity of the turbine, and when the turbine is heavily loaded the increased efficiency due to the lower exhaust pressure is substantially offset by the increased residual velocity of the steam.

When, in accordance with my present invention, a portion only of the steam is passed through the final wheel or wheels of the turbine, it is apparent that the leaving velocity of the steam thus receiving the greater expansion is appreciably less than would be the case if all of the steam were passed through the final wheel or wheels of the turbine. This portion of the steam receiving the greater expansion in the turbine is therefore utilized more efficiently in the turbine than would be the case if all of the steam were passed through the final wheel or wheels of the turbine. Furthermore, the potential energy remaining in the steam withdrawn from the turbine at the higher pressure is not wasted, but is converted into kinetic energy which may be effectively utilized in creating the proper distribution of steam in, and circulation through the condensing apparatus. The necessity for utilizing relatively large amounts of kinetic energy to properly move the steam and air through the condenser, especially in the case of large condensers operating at high vacuum, has not heretofore been clearly appreciated, at least practically, in the design of such condensers. The frictional resistance to this movement is considerable on account of the velocity with which the highly attenuated steam and air must sweep through the condensing space, and the tortuous and restricted paths through which the steam and air must flow, and the cross and eddy currents within the condensing spaces set up by the changing temperature and pressure conditions prevailing in different portions thereof. The energy required for this purpose per pound of steam, increases approximately with the square of the velocity with which the steam moves through the condenser, and hence increases approximately as the square of the pressure in the condenser decreases. The efficiency of the condenser itself, as well as its capacity, is thus directly decreased by an increase in the vacuum maintained in the condenser. Furthermore, when the vacuum in the condenser is decreased, the corresponding increase in the temperature prevailing in the condenser permits the use of hotter cooling water, or of less cooling water of the same temperature than is required when the higher vacuum is maintained. The steam operating at the higher pressure is therefore condensed more efficiently and the total bulk of the main condensing apparatus is less than if all of the steam were condensed at the lower pressure. The division of the condenser into separate portions, receiving steam in parallel so to speak, shortens the paths traveled by the steam and consequently reduces the kinetic energy required to move the steam along these paths. While the efficiency of a steam jet as an air moving device is theoretically low, the practical efficiency of the steam jets which I employ to withdraw the air from one or both of the main condenser sections is good, for the jets may be located at the proper points to reduce the work required to move the air and as the latter is preferably compressed immediately at the air outlets it does not have to be forced in its highly attenuated condition through any appreciable length of piping. The fact that the uncondensed residue from the main condensing apparatus is raised in pressure above that prevailing in the high vacuum section of the main condensing apparatus and consequently is reduced in volume before delivery to vacuum producing and auxiliary condensing apparatus proper makes it possible to reduce the bulk and cost of this final portion of the plant, the efficiency of which is also increased by increasing the pressure of the attenuated fluid handled by it. When the main condensing apparatus is divided into sections they may well be so arranged that the water of condensation forming in the high vacuum section will drain into the condensing space of the low vacuum section and be heated up therein, so that the water of condensation from both sections is delivered at the temperature prevailing in the low vacuum section. This adds substantially to the efficiency of the plant as a whole, when, as is usually the case, the water of condensation is returned to the boilers. Inasmuch as the high vacuum section of the turbine as well as of the condenser may drain into the low vacuum section, the high vacuum section of the condenser may be located above the level of the turbine when this is desirable as is frequently the case.

The various features of novelty which characterize my invention are pointed out with particularity in the claims annexed to and forming a part of this specification. For a better understanding of the invention, however, and of the advantages possessed by it, reference should be had to the accompanying drawings and descriptive matter, in which I have illustrated and described various modes of operation and forms of apparatus which may be employed in carrying out my invention.

Figure 2:
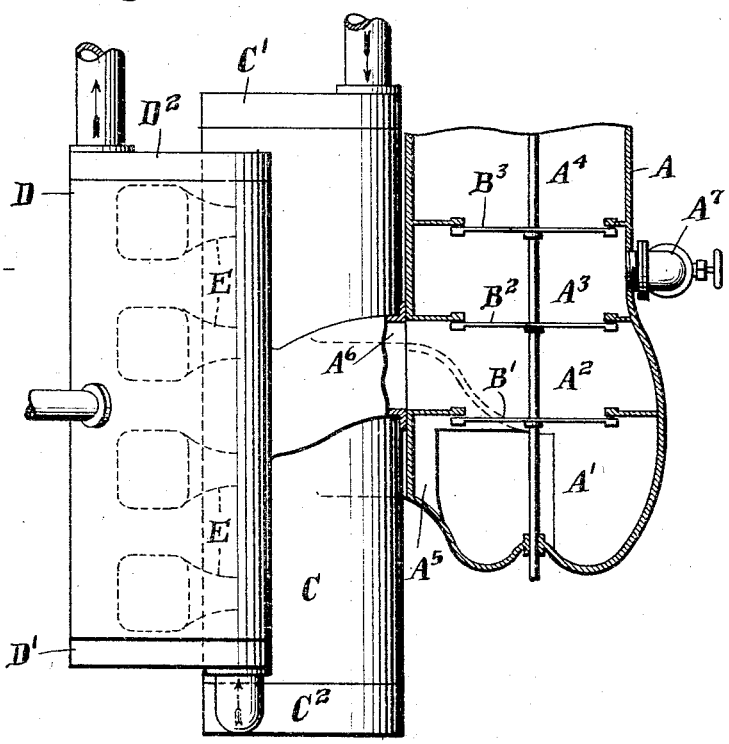

Of the drawings: Figure 1 is a diagrammatic elevation, partly in section, of one form of apparatus which I may employ; Fig. 2 is a plan, partly in section, on the line 2—2 of Fig. 1; Fig. 3 is an elevation, partly in section, of a modified form of apparatus; Fig. 4 is an elevation taken at right angles to Fig. 3; Figs. 5 to 9 are each elevations, partly in section, of forms of condensing apparatus, differing in one respect or another from each other; and Fig. 10 is a section on the line 10—10 of Fig. 9.

In the drawings, and referring first to the construction shown in Figs. 1 and 2, A represents a low pressure steam turbine, conventionally illustrated as divided into four chambers, $A'$, $A^2$, $A^3$ and $A^4$ by the turbine wheels $B'$, $B^2$ and $B^3$, and coöperating annular diaphragm portions of the turbine casing. Progressively increasing pressures are maintained in these chambers, for instance the pressures in the chambers $A'$, $A^2$, $A^3$ and $A^4$ may correspond respectively to inches of vacuum as follows: $28\frac{1}{2}$, 28, 24 and 20, the steam being expanded and imparting energy to the corresponding turbine wheel as it passes from each chamber of higher pressure into the adjacent chamber of low pressure. From the chamber $A'$ an outlet passage $A^5$ leads to the steam inlet of a surface condenser C, and a steam outlet passage $A^6$ leads from the chamber $A^2$ to the steam inlet of a surface condenser D. The condenser C is formed with cooling water inlet and outlet chambers $C'$ and $C^2$ at its ends, and similarly the condenser D is provided with cooling water inlet and outlet chambers $D'$ and $D^2$. Preferably the outlet chamber $C^2$ of the condenser C is connected to the inlet chamber $D'$ of the condenser D, so that the cold water first passes through the condenser C and then through the condenser D, as indicated by the arrows in Fig. 2. The air outlet $C^3$ from the condensing space of the condenser C is connected to the condensing space of the condenser D adjacent to the steam inlet of the latter by a plurality of nozzles E. Each nozzle E also receives steam from the chamber $A^3$ of the turbine through a corresponding alined nozzle F, the steam chest $f$ to which nozzles F are connected and the pipe $A^7$. The nozzles F are expansion nozzles and the nozzles E are compression nozzles and each pair of nozzles E and F are so relatively arranged and proportioned that the steam issuing from each nozzle F will be expanded to a pressure at or slightly below the vacuum of say $28\frac{1}{2}$ inches, which it is desired to maintain in the condenser C, while the steam and air drawn out of the air outlet $C^3$ of the condenser C, by the jet action of the steam issuing from the nozzle F, will be compressed as it passes through the nozzle E, to the pressure of say 28 inches of vacuum, which it is desired to maintain in the condenser D. The air outlet $D^3$ from the condenser D is connected to the vacuum producing and auxiliary condensing apparatus which in Fig. 1 is conventionally illustrated as consisting of a wet air pump G. The hot wells or water of condensation outlets $C^4$ and $D^4$ of the condensers C and D are connected through the seal H, and the pipe I running from the hot well $C^4$ is connected to a suitable pump (not shown) for removing the water of condensation formed in the condensers C and D. Though not strictly essential, baffles or division plates $c$ and $d$ are preferably arranged, as shown, within the condensers C and D in such manner as to insure a direct flow of steam from the steam inlet to the air outlet of each condenser, and the avoidance of pockets in the condenser in which the air, or an air and steam mixture rich in air, can collect and become stagnant.

Only a small portion of the total amount of steam passing through the turbine is required to create the jet action necessary for withdrawing the air from the high vacuum condenser C and forcing it into the lower vacuum condenser D. With the pressures prevailing in the different stages of the turbine suggested above, the amount of steam required for this purpose would be appreciably less than five per cent. of the total amount of steam passing through the turbine. The amount of steam required to produce the jet action necessary to maintain the desired differential in pressure of the two stages of the main condensing apparatus will obviously decrease with the pressure of the steam used as the motive fluid in the jets. If this steam were taken at boiler pressure less than one per cent. of the total volume of steam would be sufficient to maintain a difference in pressure in the two stages of the condensing apparatus corresponding to a half-inch of vacuum. Advantageously the turbine and condensing apparatus may be so proportioned that approximately one-half of the steam entering the chamber $A^2$ will pass into the chamber $A'$. By dividing the steam in this manner, it is possible to operate with a residual velocity of the steam entering the chamber $A'$ somewhat less than would exist if all of the steam entering the chamber $A^2$ were forced through a wheel double the diameter of the wheel $B'$ and having similarly spaced and proportioned buckets or vanes.

The apparatus shown in Figs. 3 and 4 differs from that shown in Figs. 1 and 2 in that all of the steam passed into the lower vacuum condenser DA directly from the turbine, is withdrawn from the chamber $A^2$ of the turbine through valved conduits $A^{60}$ which terminate in expanding nozzles $F'$, which create the jets for withdrawing the air from the air outlets $C^{30}$ of the condenser CA. This air and steam issuing from the nozzles $F'$ is compressed up to the pressure which it is desired to maintain in the condenser DA in passing into the latter through the compression nozzles $E'$. In this form of apparatus the division plates $c$ converge downwardly from the steam inlet of the condenser CA toward the air outlet $C^{30}$, and the air outlet $D^{30}$ toward which the division plates $d$ converge leads from the upper side of the condenser DA.

In the apparatus shown in Fig. 5 the exhaust outlet $A^{61}$ from the chamber $A^2$ of the turbine leads directly downward to the top of a condenser DB, while the exhaust steam outlet $A^{51}$ from the low pressure chamber $A'$ of the turbine leads away from the upper side of the turbine to the top of a condenser CB. The air outlets $C^{31}$ and $D^{31}$ from the condensers CB and DB respectively are connected to the inlet chambers $K'$ and $K^2$ respectively of a compound jet ejector device K. In this ejector device $K^3$ represents the expanding supply nozzle. This nozzle opens into the chamber $K'$ in line with the nozzle $K^4$ which connects the chambers $K'$ and $K^2$. $K^5$ represents the outlet nozzle leading away from the chamber $K^2$ and discharging through a suitable pipe connection into the auxiliary condensing and vacuum producing apparatus which as conventionally shown is a wet air pump G. The nozzle $K^3$ is supplied with steam from the stage $A^3$ of the turbine through the valved connection $K^6$ or from some other source through the valved connection $K^7$, and is adapted to expand the steam passing through it down to a pressure not greater than and preferably somewhat below that which it is desired to maintain in the low vacuum condensing chamber CB. The nozzle $K^4$ compresses the discharge from the nozzle $K^3$ and the fluid drawn by this jet through the chamber $K'$ from the air outlet $C^{31}$ of the high vacuum condenser CB to a pressure which does not exceed and is preferably lower than the pressure which it is desired to maintain in the condenser DB. The jet discharged by the nozzle $K^4$ and the fluid admixed therewith which is drawn by the jet from the air outlet $D^{31}$ of the condenser DB is received by the nozzle $K^5$ which is adapted to compress the fluid received by it and hence deliver the latter to the wet air pump G at a pressure above that maintained in the condenser DB.

The water of condensation forming in the condenser CB is conveyed through the pipe HA to the condenser DB being discharged into an overflowing trough $D^{10}$ secured to the shell of the condenser at a substantial distance above the bottom of the condenser. As shown, the pipe HA is formed with a loop to provide a water seal between the two condensers. Where, as shown, the exhaust steam outlet from the chamber $A'$ of the turbine leads from the upper side of the chamber, it is necessary to provide means for draining water of condensation from this chamber of the turbine. This is accomplished in the apparatus shown in Fig. 5 by providing a drain pipe HB which is formed with a water seal loop and also discharges into the overflow trough $D^{10}$ of the condenser DB. Provisions, such as are shown in Fig. 5, for draining the water of condensation forming in the high vacuum section of the main condenser and in the high vacuum chamber of the turbine casing into the lower vacuum section of the condenser possesses two distinct and important advantages. In the first place it permits the high vacuum condensing section to be located at any convenient level above the low vacuum section and above the turbine when this is desirable as is frequently the case. In the second place it permits all of the water of condensation formed in both condensing sections to be delivered at the temperature prevailing in the low vacuum section, and the heating up of the water of condensation formed in the high vacuum condenser is brought about with a minimum of apparatus and in a highly efficient manner. The heating of this water by the steam passing into the low vacuum condensing section adds substantially to the efficiency of the apparatus as a whole, for the heat thus recovered, and which would otherwise be wasted, permits auxiliary boiler feed water heating apparatus to be wholly or largely dispensed with. With the difference between the pressures ordinarily maintained in the condensers CB and DB the high vacuum condenser CB needs to have its water of condensation outlet located but a few inches or so above the level at which the pipe HA discharges into the condenser DB in order to insure a gravity flow of water of condensation from the condenser CB into the condenser DB. The economy effected in heating the condensate formed in the high vacuum section by passing it into the condensing space of the low vacuum section of the condenser is such, however, that it would pay in many cases to pump the condensate from the high vacuum section into the low vacuum section, if the conditions were such as to require this.

Figure 6:
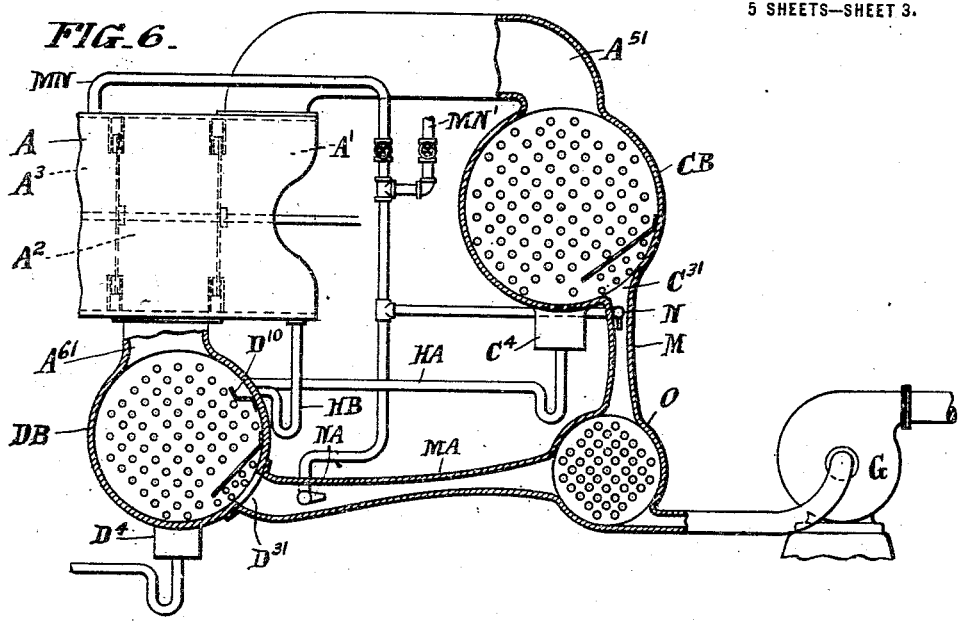

The modified form of apparatus shown in Fig. 6 does not differ from that shown in Fig. 5 except in the manner of disposing of the air passing out of the air outlets $C^{31}$ and $D^{31}$ of the condenser sections CB and DB. As shown in Fig. 6, the outlets $C^{31}$ and $D^{31}$ are connected by pipes M and MA respectively to an auxiliary condenser O. Inserted in the pipe M is a nozzle N, the pipe and nozzle being shaped to form a jet ejector which will withdraw air from the condenser CB and deliver the mixture of this air with the steam passing through the nozzle N to the auxiliary condenser O at a pressure appreciably above that maintained in the high vacuum condenser CB. Similarly the pipe MA is provided with an ejector nozzle NA and the pipe and nozzle form a means for withdrawing air from the low vacuum condenser DB and compressing the mixture of this air with the steam passing through the nozzle NA up to the same or approximately the same pressure at which the steam and air mixture passing through the pipe M is delivered to the auxiliary condenser O. The nozzles N and NA may be supplied with steam from the stage $A^3$ of the turbine A through the pipe MN or may be supplied with steam from an independent source through the pipe MN'.

Figure 7:
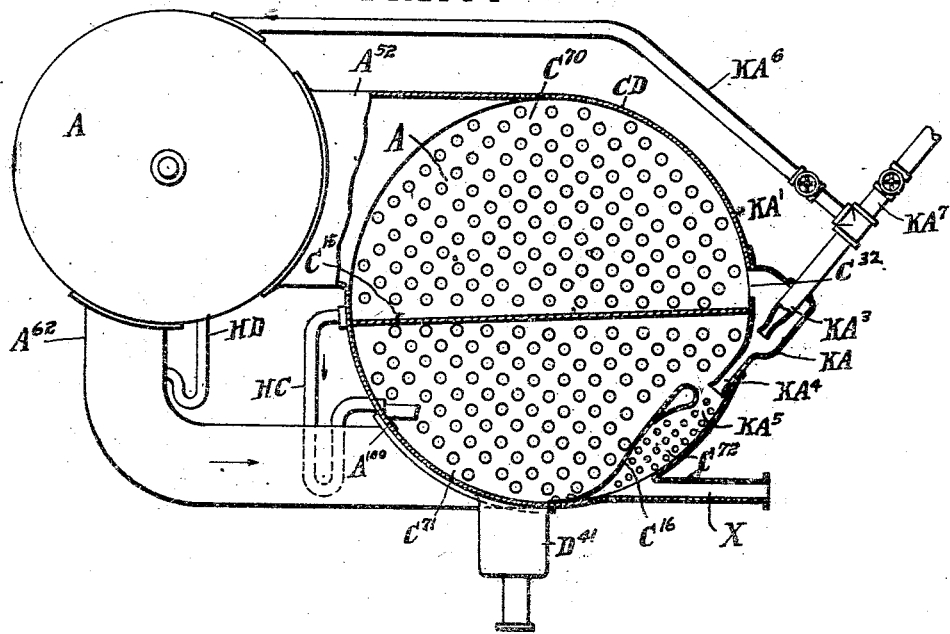

In the modification shown in Fig. 7 the high and low vacuum condensing spaces or chambers $C^{70}$ and $C^{71}$ respectively of the main condenser are formed in the shell of a single condenser structure CD, the two condensing spaces being separated by a partition $C^{15}$ slightly inclined to the horizontal so that the water of condensation falling thereon will run naturally to the side of the condenser shell from which the drain pipe HC leads to the overflow trough $A^{100}$ located in the lower condensing space $C^{71}$. The high vacuum stage of the turbine A has its exhaust steam outlet $A^{52}$ connected to the upper main condensing space $C^{70}$, while the lower main condensing space $C^{71}$ is connected to the exhaust steam outlet $A^{62}$ from the intermediate stage of the turbine. The high vacuum stage of the turbine drains through a seal pipe HD into the exhaust steam pipe $A^{62}$. The air outlet $C^{32}$ from the high vacuum chamber $C^{70}$ of the condenser CD opens to the inlet chamber KA' of a compound jet ejector KA. The steam supply nozzle $KA^3$ of this device is supplied with steam through the pipe $KA^6$ from a high pressure stage of the turbine, or from an independent source through pipe $KA^7$, and discharges into the chamber KA' in line with the compressing nozzle $KA^4$. The latter opens at its inner end into the condensing chamber $C^{71}$ of the main condenser and in line with and in close proximity with the compressing nozzle $KA^5$ which connects the condensing space $C^{71}$ to an air cooling space $C^{72}$ formed within the condensing shell and separated from the space $C^{71}$ by a partition $C^{16}$. X represents the outlet from the space $C^{72}$ through which the uncondensed fluid may be finally withdrawn from the condenser by a suitable wet air pump or other vacuum producing device, which may also serve to withdraw any condensate forming in the space $C^{72}$. The arrangement of the steam inlet at the bottom of the low vacuum condenser space $C^{71}$ as shown in Fig. 7, possesses the advantage of insuring that the water of condensation passing through and formed in the space $C^{71}$ will be heated up to practically the temperature of the steam passing into the space $C^{71}$.

The apparatus shown in Fig. 8 differs from that shown in Figs. 5 and 6 only in the means employed for withdrawing air from the high and low vacuum condensers CB and DB respectively, and in the auxiliary condensing and vacuum producing apparatus. The auxiliary condensing and vacuum producing apparatus shown in Fig. 8 comprises a casing Q formed with a steam inlet chamber Q' which may receive steam through the pipe $Q^{10}$ from a high pressure stage of the turbine or may be supplied with steam through the pipe $Q^{11}$ from an independent source. The steam supplied to the chamber Q' passes through expanding nozzles $Q^2$ and alined compressing nozzles $Q^4$ into a turbine wheel chamber $Q^5$, and the nozzles $Q^2$ and $Q^4$ have their adjacent but slightly separated ends open to a chamber $Q^3$ formed in the casing, and this chamber is connected to and receives the air issuing from the condenser CB through the air outlet $C^{31}$. The steam and air mixture passing through the nozzles $Q^4$ and slightly compressed therein is discharged against a turbine wheel R and rotates the latter. The turbine wheel chamber $Q^5$ is connected to the air outlet $D^{31}$ of the condenser DB and receives the uncondensed fluid from the latter. The fluid passing through the turbine wheel R leaves the latter with sufficient velocity to carry the mixture of air and steam out of the chamber $Q^5$ through the compressing nozzles $Q^6$ in which this mixture is further compressed and by which the mixture is delivered to auxiliary condensing and vacuum producing apparatus. This apparatus is a rotary jet condenser and air compressor driven by the turbine wheel R. The rotary impeller S of the rotary condenser and air compressor works in the chamber S'. Hurling water is supplied to the impeller through the supply pipe $S^3$ and air and water is discharged by the impeller into the diffusion chamber $S^2$.

In the condensing apparatus shown in Figs. 9 and 10, the condenser structure CE proper is essentially the same as the condenser CD shown in Fig. 7. In the apparatus shown in Figs. 9 and 10, however, the space $C^{73}$, which is generally like the space $C^{72}$ of the condenser CD, is arranged to drain water of condensation forming therein into the hot well $D^{41}$ of the low vacuum main condensing space $C^{71}$ proper through the sealed drain pipes HE, and an air compressing turbine is employed for withdrawing the uncondensed residue from the space $C^{73}$ through the pipe X'. The air compressing turbine proper comprises a steam chest $Q^{100}$ to which steam is supplied through the pipe $Q^9$ from a source of live steam or from a high pressure stage of the turbine exhausting into the condensing apparatus. The steam chest $Q^{100}$ opens into the wheel chamber $Q^{12}$ of the air compressing turbine through the expanding nozzles $Q^{110}$ which expand the steam passing through them down to a pressure at or below that maintained in the main condensing space $C^{71}$. In the wheel chamber $Q^{12}$ the steam entering through the nozzles $Q^{110}$ is admixed with the uncondensed residue drawn from the main condensing space $C^{71}$ through the pipe X'. As shown, the latter opens to a chamber $Q^{13}$ surrounding the nozzles $Q^{110}$ and like the latter open to the wheel chamber $Q^{12}$. The steam and air escapes from the wheel chamber through the recompressing nozzles $Q^{14}$ which discharge into a chamber $Q^{15}$. The latter opens to the gaseous inlet chamber U' of a multiple water jet ejector U of common form. The water supplied to the ejector U is the water of condensation from the condensing apparatus which passes through the pipe $D^{42}$ from the hot well $D^{41}$ to the water inlet T' of a multistage pump T of common form, which discharges to the water inlet of the ejector U. The impeller $T^2$ of the pump T is driven by the wheel RA. The latter also serves to drive the impeller of the pump V employed for circulating the cooling water through the tubes traversing the condensing spaces $C^{70}$, $C^{71}$ and the air cooling and auxiliary condensing space $C^{72}$. As shown, the discharge pipe $V^2$ of the pump V leads to the water space $C^{81}$ to which the upper tubes of the condenser are connected at one end. These tubes are connected at their other ends to the water space $C^{83}$, to which is also connected the corresponding ends of the remaining tubes. The latter open at their opposite ends to the water space $C^{82}$ from which the discharge pipe $C^{84}$ runs to the cooling tower or other place or device for utilizing or disposing of the heated cooling water. To avoid the formation of air pockets within the pump T handling the condensate, the pipe $D^{42}$ or the casing of the pump is connected by a vent pipe $T^{10}$ to the high vacuum main condensing space $C^{70}$.

In the operation of the apparatus shown in Figs. 9 and 10, the desired high vacuums of say twenty-eight and one-half inches and twenty-seven inches of mercury are maintained in the main condensing spaces $C^{70}$ and $C^{71}$, respectively. In the air cooling and auxiliary condensing space $C^{73}$ a vacuum is maintained slightly lower than that in the space $C^{71}$, say a vacuum of between twenty-six and twenty-seven inches. At the gaseous inlet to the ejector U a substantially lower vacuum, of say fifteen or twenty inches of mercury is maintained. The ejector U will be arranged to discharge at atmospheric pressure. By arranging and operating the apparatus shown in Figs. 9 and 10 in the manner described, I am enabled to minimize the amount of cooling water required and to deliver the condensate at a relatively high temperature. The effective use of the condensate as the motive fluid in the water ejector U for finally disposing of the air withdrawn from the various condensing spaces is made possible notwithstanding the heated condition of this water and its comparatively small amount, by the fact that the vacuum of say fifteen or twenty inches maintained by the water ejector is relatively low. It will be observed that I make no attempt to condense the steam supplied to the primary ejectors KA by means of the condensate, but notwithstanding this fact I am enabled to heat the condensate to a comparatively high temperature. While the steam supplied to the primary ejectors must be condensed by the cooling water passing through the tubes traversing the space $C^{73}$ and the heat thus abstracted by the cooling water is in a sense wasted, yet the amount of heat thus wasted is comparatively small and the increase in the amount of heat which must be abstracted by the cooling water in this portion of the condensing apparatus is compensated for by a decrease in the amount of heat which must be imparted to the cooling water in other portions of the apparatus where it is more advantageous to reduce the amount of heat to be abstracted by the cooling water.

No claim is made herein to the air compressing turbines shown in Figs. 8, 9 and 10, except as these are utilized in carrying out the methods, or in the general combinations claimed herein, since these turbines standing by themselves are not my sole invention, but were invented jointly by George H. Gibson and myself, and are claimed in our joint application Serial No. 733,941, filed November 29th, 1912.

The apparatus shown in Figs. 1 to 4 herein is different in its general arrangement and mode of operation from that shown in the remaining figures in that in the apparatus shown in Figs. 1 to 4 the uncondensed fluid from the main high vacuum condensing space is forced through the main lower vacuum condensing space, a portion of the energy of the steam condensed being employed to effect this, while in the apparatus shown in the remaining figures each of the two main condensing spaces is independently connected to the auxiliary condensing and vacuum producing apparatus, and claims specific to the apparatus shown in Figs. 1 to 4 inclusive and to the methods carried out by the aid of this apparatus are made in my prior application Serial No. 734,050, filed November 29, 1912, wherein the apparatus shown in Figs. 1 to 4 as well as other forms of apparatus similar thereto in general arrangement and mode of use are disclosed. The present application while filed at a later date than said application Serial No. 734,050, is intended nevertheless to be generic to the latter in so far as they disclose in common a plurality of main condensers operating at different vacuums, and receiving steam from the different stages of a multistage turbine or otherwise, and delivering their uncondensed residue fluids into a common auxiliary condensing and vacuum producing apparatus.

While in accordance with the provisions of the statutes I have illustrated and described the best forms of my invention now known to me, it will be apparent to those skilled in the art that changes may be made in the form of apparatus disclosed herein without departing from the spirit of my invention, and that under some conditions certain features of my invention may be used without a corresponding use of other features.

Having now described my invention, what I claim as new and desire to secure by Letters Patent, is:

1. The method of utilizing and condensing low pressure steam which consists in abstracting and utilizing for power purposes unequal proportions of the energy in different fractional parts of the steam, passing parts of the steam retaining successively larger proportions of energy into condensing spaces in which successively lower vacuums are maintained and passing the uncondensed fluid residue from said condensing spaces into a common auxiliary condensing and vacuum producing apparatus, after first compressing the residue from the high vacuum condensing space or spaces to a pressure equal to or above that maintained in a condensing space operating at a lower vacuum.

2. The method of utilizing and condensing low pressure steam which consists in abstracting and utilizing for power purposes unequal proportions of the energy in different fractional parts of the steam, passing parts of said steam retaining successively larger proportions of energy into condensing spaces in which successively lower vacuums are maintained, and separately passing the uncondensed fluid residue from said condensing spaces into a common auxiliary condensing and vacuum producing apparatus, after first compressing the residue from the high vacuum condensing space or spaces to a pressure equal to or above that maintained in a condensing space operating at a lower vacuum.

3. The method of condensing steam supplied from two sources at different pressures each of which is below that of the atmosphere which consists in providing a separate main condensing space for the steam from each source, maintaining correspondingly different vacuums in the different condensing spaces, passing the uncondensed residue fluid from each of said condensing spaces into auxiliary condensing and vacuum producing apparatus, and compressing the non-condensable fluid issuing from the high vacuum condensing space to a pressure equal to or above the pressure in the lower vacuum condensing space before delivering it to said auxiliary apparatus.

4. The method of condensing steam supplied from two sources at different pressures each of which is below that of the atmosphere which consists in providing a separate main condensing space for the steam from each source, maintaining correspondingly different vacuums in the different condensing spaces, passing the uncondensed residue fluid from each of said condensing spaces into auxiliary condensing and vacuum producing apparatus, compressing the non-condensable fluid issuing from the high vacuum condensing space to a pressure equal to or above the pressure in the lower vacuum condensing space before delivering it to said auxiliary apparatus, and passing the water of condensation forming in the high vacuum condensing space into the low vacuum condensing space.

5. The method of condensing steam supplied from two sources at different pressures each of which is below that of the atmosphere which consists in providing a separate main condensing space for the steam from each source, maintaining correspondingly different vacuums in the different spaces, separately passing the uncondensed residue fluid from each of said condensing spaces into auxiliary condensing and vacuum producing apparatus, and compressing the non-condensable fluid issuing from the high vacuum condensing space or spaces to a pressure equal to or above the pressure in the lower vacuum condensing space before delivering it to said auxiliary apparatus.

6. In combination, a turbine comprising a higher pressure stage with an exhaust steam outlet therefrom and a low pressure stage receiving a portion of the steam passing through said higher pressure stage and having a separate exhaust steam outlet, a multistage condenser comprising two main condensing sections operating at different vacuums and connected one to one and the other to the second of said outlets, a common vacuum producing and auxiliary condensing apparatus receiving the uncondensed residue from both of said condensing sections and means for compressing the residue from the high vacuum section to a pressure not less than that maintained in the low vacuum section before delivery to said apparatus.

7. In combination, a turbine comprising a higher pressure stage with an exhaust steam outlet therefrom and a low pressure stage receiving a portion of the steam passing through said higher pressure stage and having a separate exhaust steam outlet, a multistage condenser comprising two main condensing sections operating at different vacuums and connected one to one and the other to the second of said outlets, a common vacuum producing and auxiliary condensing apparatus separately connected to and receiving the uncondensed residue from both of said condensing sections and means for compressing the residue from the high vacuum section to a pressure not less than that maintained in the low vacuum section before delivery to said apparatus.

8. In combination, a turbine comprising a higher pressure stage with an exhaust steam outlet therefrom and a low pressure stage receiving a portion of the steam passing through said higher pressure stage and having a separate exhaust steam outlet, a multistage condenser comprising two main condensing sections operating at different vacuums and connected one to one and the other to the second of said outlets, means for removing the uncondensed residue from said condensing sections, and sealed drain connections for conveying water of condensation forming in said low pressure turbine stage and in the condensing section operating at the higher vacuum into the condensing space of the condensing section operating at the lower vacuum.

9. Apparatus for condensing steam supplied at two different pressures comprising in combination two main condensing sections operating at the different pressures and a common vacuum creating and auxiliary condensing apparatus receiving the uncondensed residue from said sections and means for compressing the uncondensed residue from the condensing section operating at the lower pressure to a pressure not less than that maintained in the other condensing section before delivery to said apparatus.

10. Apparatus for condensing steam supplied at two different pressures comprising in combination two main condensing sections operating at the different pressures and a common vacuum creating and auxiliary condensing apparatus separately connected to and receiving the uncondensed residue from said sections and means for compressing the uncondensed residue from the condensing section operating at the lower pressure to a pressure not less than that maintained in the other condensing section before delivery to said apparatus.

11. Apparatus for condensing steam supplied at two different pressures comprising in combination, two main condensing sections operating at the different pressures, means for withdrawing the uncondensed residue from said sections and means for passing the water of condensation formed in the section operating at the lower pressure into the condensing space of the section operating at the higher pressure.

12. Apparatus for condensing steam supplied at two different pressures, comprising a condensing section operating at the higher of said pressures, a condensing section operating at the lower of said pressures and located at a higher level than the first mentioned section, and a drain connection for conveying water of condensation forming in the section operating at the lower pressure into the condensing space of the other section.

13. Apparatus for condensing steam supplied at two different pressures, comprising a condensing section operating at the higher of said pressures, a condensing section operating at the lower of said pressures and located at a higher level than the first mentioned section, and a drain connection for conveying water of condensation forming in the section operating at the lower pressure into the condensing space of the other section, said connection being shaped to provide a water seal sufficient to prevent the flow of steam or air through said connection.

14. Apparatus for condensing steam supplied at two different pressures comprising two condensing sections operating at the two pressures, means for passing cooling water in series first through the condensing section operating at the lower pressure and then through the section operating at the higher pressure and means for passing the condensate forming in the section operating at the lower pressure into the condensing space of the section operating at the higher pressure.

15. Apparatus for condensing steam supplied at two different pressures, comprising a condensing section operating at the higher of said pressures, a condensing section operating at the lower of said pressures, a water ejector, means for passing the condensate forming in said main condensing section through said ejector, means for passing the uncondensed residue from both of said main condensing sections to said water ejector after compressing said residue to a pressure below that at which said ejector delivers but appreciably above that maintained in the main condensing space operating at the higher pressure.

16. Apparatus for condensing steam supplied at two different pressures comprising in combination two main condensing sections operated at the different pressures, an air cooling and auxiliary condensing section, means for delivering the uncondensed residue from both of said main sections to said air cooling and auxiliary condensing section, an air compressing turbine, means for supplying the latter with steam for operating the turbine and for drawing through the latter and raising the pressure of the uncondensed residue from said auxiliary section, a water ejector receiving the gaseous exhaust from said air compressing turbine and a condensate pump for delivering the condensate from said main sections to said water ejector.

17. Apparatus for condensing steam supplied at two different pressures comprising in combination two main condensing sections operated at the different pressures, an air cooling and auxiliary condensing section, means for delivering the uncondensed residue from both of said main sections to said air cooling and auxiliary condensing section, an air compressing turbine, means for supplying the latter with steam for operating the turbine and for drawing through the latter and raising the pressure of the uncondensed residue from said auxiliary section, a water ejector receiving the gaseous exhaust from said air compressing turbine, and a condensate pump for delivering the condensate from said main sections to said water ejector connected to and driven by said air compressing turbine.

18. Apparatus for condensing steam supplied at two different pressures comprising in combination two main condensing sections operated at the different pressures, an air cooling and auxiliary condensing section, means for delivering the uncondensed residue from both of said main sections to said air cooling and auxiliary condensing section, an air compressing turbine, means for supplying the latter with steam for operating the turbine and for drawing through the latter and raising the pressure of the uncondensed residue from said auxiliary section, a water ejector receiving the gaseous exhaust from said air compressing turbine, and a condensate pump for delivering the condensate from said main sections to said water ejector and a cooling water circulating pump, both of said pumps being connected to and driven by said air compressing turbine.

19. Apparatus for condensing steam supplied at two different pressures, comprising in combination, two main condensing sections operating at the different pressures and means for utilizing heat abstracted from the steam entering the condensing section operating at the higher pressure to reheat water of condensation formed in the section operating at the lower pressure.

PAUL A. BANCEL.

Witnesses:
 HENRI R. Ross,
 ARTHUR J. SIGET.